C. G. ANTHONY.
MEANS OF HANDLING NATURAL CARBONATED WATERS.
APPLICATION FILED OCT. 9, 1915.
1,279,216.
Patented Sept. 17, 1918.
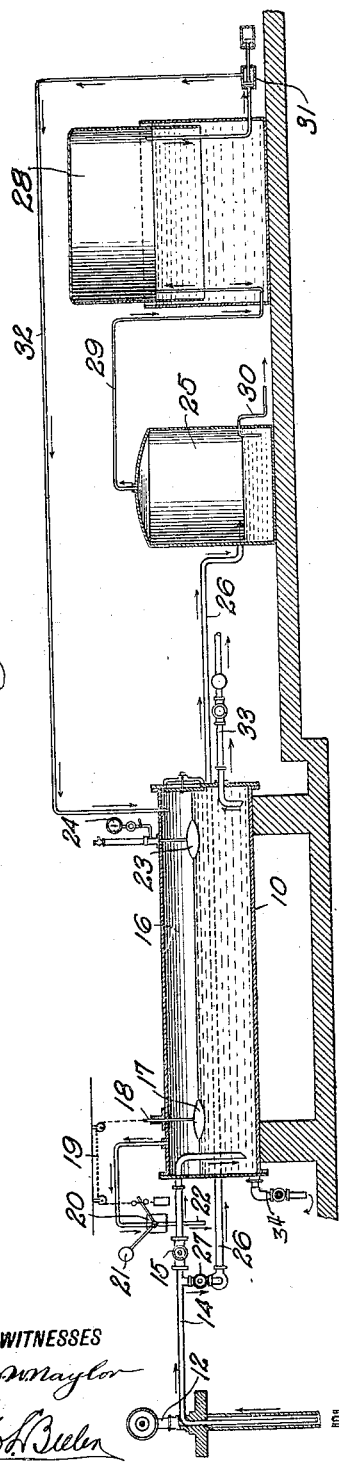
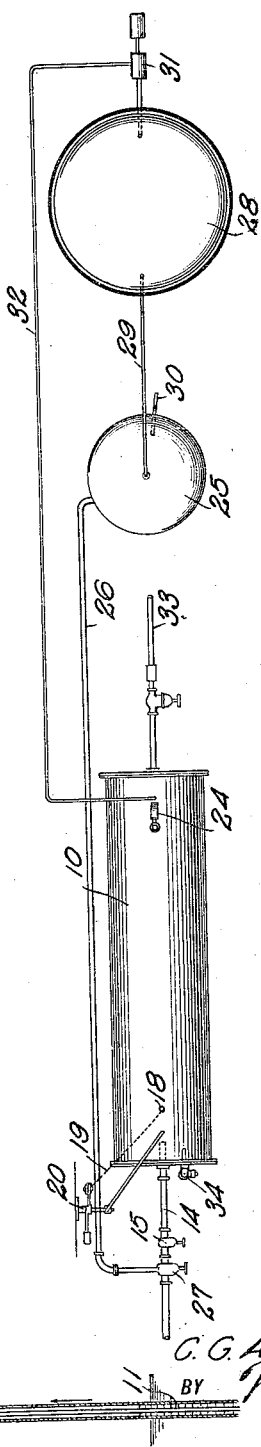
WITNESSES
INVENTOR
C. G. Anthony
BY
ATTORNEYS

UNITED STATES PATENT OFFICE.

CHARLES G. ANTHONY, OF SARATOGA SPRINGS, NEW YORK.

MEANS OF HANDLING NATURAL CARBONATED WATERS.

1,279,216.     Specification of Letters Patent.     Patented Sept. 17, 1918.

Application filed October 9, 1915. Serial No. 55,107.

*To all whom it may concern:*

Be it known that I, CHARLES G. ANTHONY, a citizen of the United States, and a resident of Saratoga Springs, in the county of Saratoga and State of New York, have invented a new and Improved Means of Handling Natural Carbonated Waters, of which the following is a full, clear, and exact description.

This invention relates to means of manipulating natural mineral waters. It has particular reference to the treatment or handling of waters naturally charged with carbon dioxid.

Among the objects of the invention is to provide a means for conserving the condition of natural mineral waters impregnated with large quantities of carbon dioxid.

Another object of the invention is to provide a means whereby, when the water supply is running light or weak in carbon dioxid, such weaker solutions are treated to separate the gas from the water, the gas being stored temporarily in a suitable gasometer whence it is pumped or otherwise forced or delivered into the mineral water storage reservoir to strengthen or enrich the carbonation of the water therein so as to maintain the degree of carbonation up to a certain standard.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a vertical longitudinal section in diagram of a suitable apparatus to carry out the purposes above set forth; and Fig. 2 is a plan view of the principal parts of the same.

In order to submit a more comprehensive statement of the conditions and requirements appertaining to this invention, I may state briefly that at different localities on the earth's surface mineral water containing carbon dioxid or carbonic acid gas rises to or appears at the surface, and if a well be drilled or driven at such a point there will usually be found a water basin from which water can be pumped or made to flow highly charged with carbon dioxid. Such waters, as stated herein, are found in several places in the United States and in some other countries, notably Germany, such waters being famous and highly desirable for internal and external uses.

The means relied upon by me are practicalized by reliance upon a well known law of chemistry, to wit: at atmospheric pressure one volume of water at about 60 degrees F. will contain in solution one volume of carbon dioxid. If water associated with carbon dioxid is subjected to two atmospheres of pressure, one volume of water will dissolve two volumes of gas, and so on, the solubility of the gas varying directly as the pressure up to about five atmospheres. From the foregoing law it is deduced that at some point or depth beneath the earth's surface there is reached a point or zone where the pressure due to the superimposed water is so great that all or practically all of the gas is in solution, but as the water under ordinary conditions is elevated toward the surface of the earth with a corresponding reduction in pressure, the amount of gas retained in solution is gradually reduced.

Pursuant to the foregoing facts and principles, therefore, I provide at 10 a mineral water reservoir which, except for the necessary vents required in controlling the supply of water and gas thereto or therefrom, is maintained hermetically sealed. At 11 I indicate what may be regarded as a pump cylinder located at such depth below the surface of the earth as to act directly upon a supply of water naturally sufficiently highly charged with carbon dioxid to meet the requirements at any particular place of use. At 12 is indicated a suitable pump for forcing the water upwardly from the cylinder 11 through the tubing 13 and 14 for delivery into the reservoir 10. A valve 15 controls the flow of water through the pipe 14 but is normally open when the water is pumped directly to the reservoir.

The provision of the reservoir is such that enough of the natural carbon dioxid will be contained in solution in the water delivered thereinto for the purposes for which the water is used. In other words, the capacity and structure of the reservoir are such that when the level of the water in the reservoir corresponds to a predetermined indication, there will be a cushion of carbon dioxid at 16 between the top of the water and the top of the reservoir. It follows that the volume and density of the cushion of free gas will determine the degree of pressure upon the water, and hence the amount of gas dissolved therein. When the reservoir 10 is practically empty of water and it is to be refilled, with the service pipe 33 closed, it is desirable to exhaust some of the gas from the reservoir at 16, so that when the water level rises in the reservoir it will not have so much gas to compress. To this end there is provided a float 17 having a stem 18 slidable through the top of the reservoir and having a flexible connection 19 to a valve 20 provided with an adjustable weight 21. Hence, when the water reaches a predetermined low level the float will automatically open the valve 20 and so at the beginning of the refilling operation the pressure within the tank will be substantially atmospheric.

At 23 I show another float associated with an indicator 24 to show to the operator the depth of the water in the reservoir. Provision is made to separate from the natural carbonated water at times when the wells are supplying more water than is demanded, the natural carbon dioxid for future introduction into the reservoir 10 so as to maintain the desired proportion of carbon dioxid to the water used. To carry out this requirement, therefore, I provide a gas separator 25 into which the water weak in carbon dioxid is pumped through a pipe 26 in which is fitted a cutoff valve 27 normally closed when the valve 15 is open. Upon closing the valve 15, however, and opening the valve 27, the water from the well is delivered directly into the separator 25. Because of the relatively low pressure of the atmosphere in this separator, the carbon dioxid passes freely from the water and thence to a gasometer 28 through a pipe 29. The water is permitted to waste through a pipe 30 adjacent the bottom of the separator. This operation presupposes that there is always a sufficient supply of water charged more or less highly with carbon dioxid for the purposes of the establishment. When the supply is running sufficiently charged, it is used directly through the reservoir 10. During those hours of the day or night, however, when comparatively little water is demanded, the water, irrespective of the amount of gas carried by it, may be pumped around the reservoir 10 to the separator so as to store up a supply of natural carbon dioxid in the gasometer 28 so that sufficient gas may be pumped therefrom by means of the pump 31 through the pipe 32 to the reservoir 10 to make up any deficit in the amount of the gas to charge the water in the reservoir 10 so as to keep it up to the standard, as already explained. It will be borne in mind, therefore, that when it is possible to secure water sufficiently charged with gas for the purposes of the establishment, such water will be pumped into the reservoir and used therefrom without the loss of any material portion of the gas naturally contained therein, but if the water should be running low in carbon dioxid in solution, the deficit may be made up at any time by delivering the required amount of the carbon dioxid previously separated from the same character of water and stored temporarily in the gasometer. I am therefore able to maintain a substantially uniform level of water in the service reservoir 10 and to maintain such water at a substantially standard degree of carbonation. The service pipe 33 is employed to draw water from the reservoir 10, and at 34 is indicated a waste pipe leading from the same reservoir to the sewer.

It is desirable at times to secure a water not so heavily saturated with minerals as is its condition when it emerges from the ground. This is made possible in this apparatus by operating the air compressor or gas pump 31 so that gas is pumped from the cylinder 10 through pipe 32 and exhausted into the gasometer 28. If enough gas is pumped from the cylinder 10, the water therein will not hold all of its mineralization and some of it is precipitated to the bottom of the cylinder 10, some of the soluble bicarbonates being converted into insoluble carbonates. This partial vacuum is maintained two or more hours, depending upon the amount of precipitation required. The cylinder is then recharged with gas by means of the air compressor 31 pumping gas from the gasometer 28, and a pressure reëstablished in the cylinder 10. The delivery of water is then proceeded with through the pipe 33 to the bottling machine where it is placed in bottles free from a certain percentage of its mineralization.

I claim:

The combination of a storage reservoir for water at a high degree of carbonation, a gas separator, a gasometer associated with the gas separator, means to force gas from the gasometer to the reservoir, and means to pump natural carbonated water directly either to the reservoir or to the separator, substantially as and for the purposes set forth.

CHARLES G. ANTHONY.

Witnesses:
MICHAEL J. MULQUEEN,
GEORGE W. AINSWORTH.

Copies of this patent may be obtained for five cents each, by addressing the "Commissioner of Patents, Washington, D. C."